United States Patent [19]

Petersen

[11] 4,367,602
[45] Jan. 11, 1983

[54] LOCK AND KEY RETAINER FOR EXCAVATOR TOOTH

[76] Inventor: Gerald A. Petersen, 37 Sullivan Dr., Moraga, Calif. 94556

[21] Appl. No.: 310,472

[22] Filed: Oct. 13, 1981

[51] Int. Cl.$^3$ .............................................. E02F 9/28
[52] U.S. Cl. ............................... 37/142 A; 24/211 L; 299/92; 403/317; 403/324; 411/353; 411/517
[58] Field of Search ............ 37/142 A, 142 R, 141 T, 37/141 R; 403/317, 324, 155; 24/211 L, 211 R; 299/92; 279/79, 80, 82, 84, 89; 411/516, 517, 352, 353

[56] References Cited

U.S. PATENT DOCUMENTS

| | | | |
|---|---|---|---|
| 3,751,834 | 8/1973 | Petersen | 37/142 R |
| 3,952,433 | 4/1976 | Heinold et al. | 37/142 A |
| 4,050,172 | 9/1977 | Petersen | 37/142 A |

FOREIGN PATENT DOCUMENTS 2211010  9/1973  Fed. Rep. of Germany ...... 411/517

Primary Examiner—Clifford D. Crowder
Assistant Examiner—Moshe I. Cohen
Attorney, Agent, or Firm—Julian Caplan

[57] ABSTRACT

Two staple-like spring metal parts designated "lock" and "key" are provided to retain an excavating tooth in a holder. The lock part slides into an opening in the holder for the tooth around a reduced diameter portion of the shank of the tooth and thereby prevents withdrawal of the tooth by interfering with the outward movement of a button on the extreme end of the shank. The legs of the lock are biased outwardly by reason of the unstressed shape of the lock. These outwardly biased legs are forced inward by insertion in the opening of a key which fits outward of the lock and forces the legs of the lock inward into locked position, engaging a portion of the shank. When the key is removed, it provides space for outward movement of the legs of the lock and thereby prevents a tendency of dirt compacting in the opening of the holder from preventing withdrawal of the lock.

9 Claims, 12 Drawing Figures

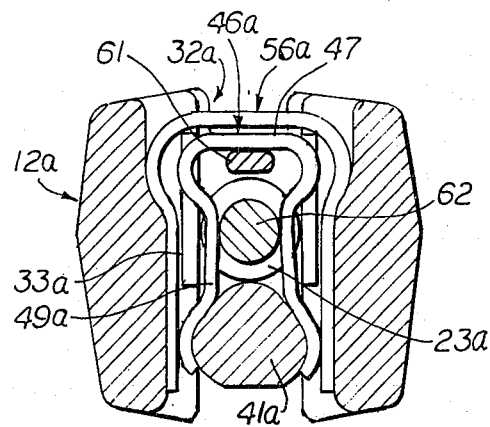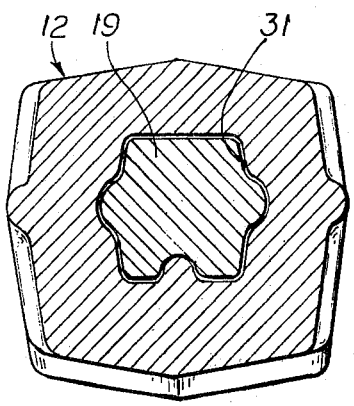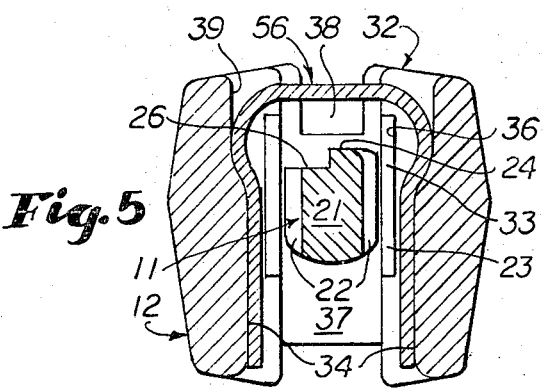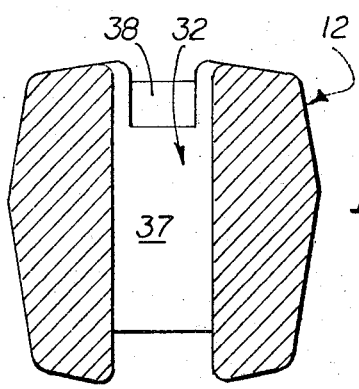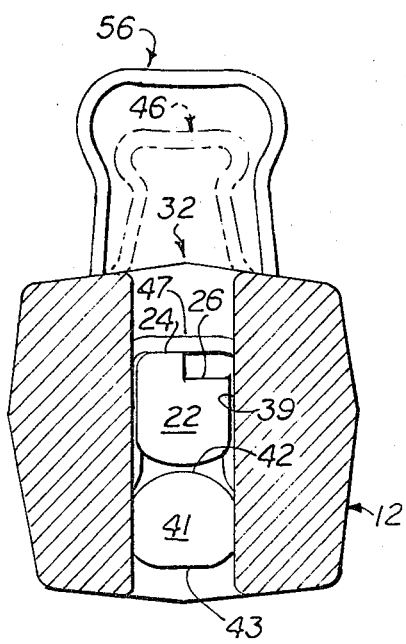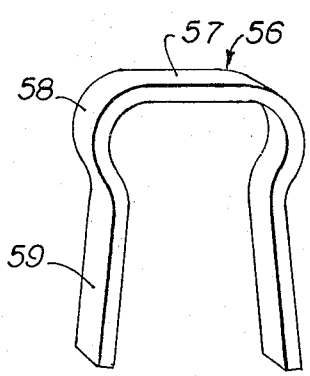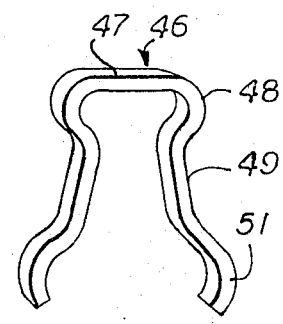

LOCK AND KEY RETAINER FOR EXCAVATOR TOOTH

This invention relates to a new and improved staple-type retainer for an excavator tooth. Reference is made to U.S. Pat. No. 4,050,172 on which the present invention is an improvement.

Most commercially available means for retaining excavator teeth in holders or adapters positively secure the teeth and holders together. Hence, the force imposed upon the teeth by the work being excavated is imposed directly on the retainers and thence from the retainers to the holders which are attached by means forming no part of the present invention to some portion of pieces of excavating equipment. An important advantage of the present invention is that, during excavation, the retainer is never under strain because the force imposed upon the tooth is imparted through a shoulder on the tooth directly to the holder. The retainer of the present invention functions merely to prevent the tooth from being withdrawn from the holder. Removing the retaining means, hereinafter described in detail, permits the tooth to be separated from the holder for replacement, sharpening or other purpose. Under some conditions, the work tends to pull the tooth from its socket in the holder and such pulling is resisted by the retainer. However, the force tending to pull the tooth from the holder is minimal and intermittent and is adequately resisted by the retainer hereinafter described.

A principal purpose and advantage of the present invention is the fact that a positive lock is provided by means of a first retainer member which is of a resilient material and generally staple-shaped configuration with the legs of the staple divergent. When the diverging legs are forced inward, they engage in front of an enlarged button on the proximal end of the tooth shank and prevent withdrawal of the tooth. The legs of the lock member are forced inward by a second staple-like retainer member which fits outside the first mentioned member and, when inserted into the retainer, forces the legs of the lock into position to prevent withdrawal of the tooth.

A still further feature of the invention is the fact that the holder is formed with a permanent lock member around which a portion of the legs of the staple-shaped lock engage.

It has been found that, if dirt is impacted behind the retainer shown in U.S. Pat. No. 4,050,172, the retainer cannot readily be withdrawn. In accordance with the present invention, when the key is withdrawn, the space previously occupied by the key is adequate for the spreading of the staple-shaped lock. Accordingly, the present invention prevents dirt from jamming the retainer in a position such that the tooth may not conveniently be separated from the retainer. Another advantage of the present invention is the absence of rubber or other materials in the retainer which deteriorates under extremely hot or cold conditions. Thus the retainer of this invention is effective under extreme temperature conditions.

Other objects of the present invention will become apparent upon reading the following specification and referring to the accompanying drawings in which similar characters of reference represent corresponding parts in each of the several views.

In the drawings:

FIG. 3 is a sectional view taken substantially along the line 3—3 of FIG. 1.

Figure 1:
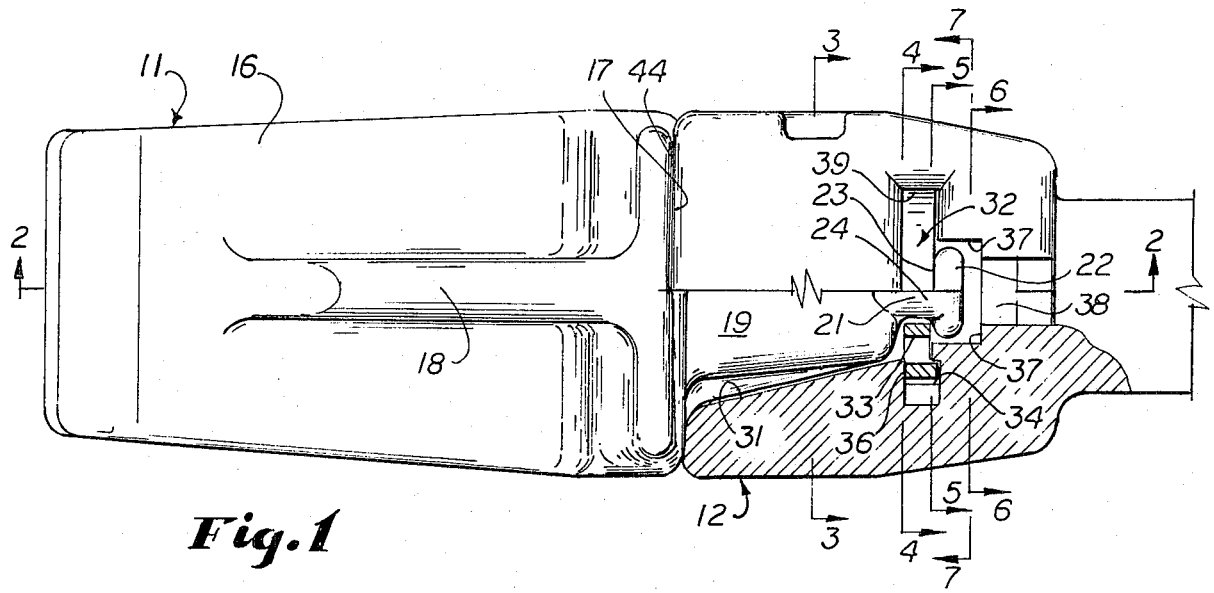
FIG. 1 is a plan view of a tooth and a portion of the holder, the holder being partially broken away and sectioned to reveal internal construction.

FIGS. 5, 6, and 7 are, respectively, sectional views taken substantially along corresponding lines in FIG. 1.

FIG. 8 is a perspective view of the key or first retainer portion of the retainer means.

FIG. 9 is a perspective view of the lock or second retainer portion of the retainer means.

Figure 4A:
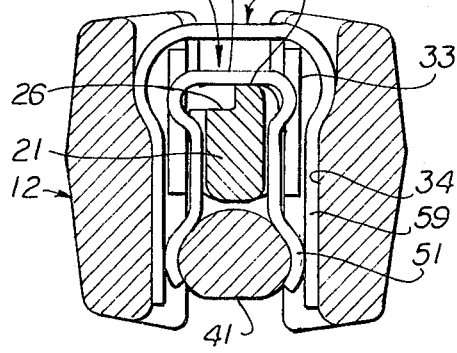
FIG. 4A is a sectional view taken substantially along the line 4—4 of FIG. 1 showing the lock and key in operative position.

FIG. 10 is a view similar to FIG. 4A of a modification.

Figure 2:
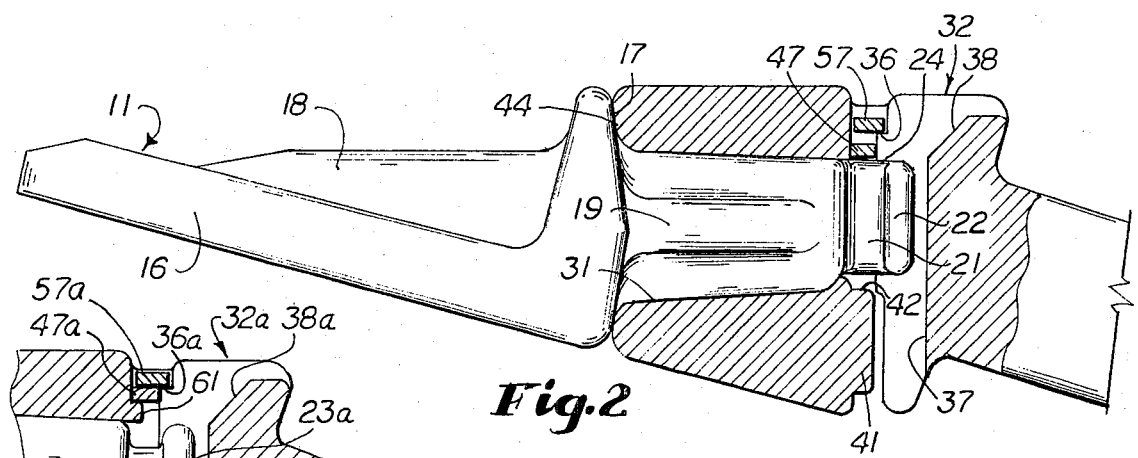
FIG. 2 is a sectional view taken substantially along the line 2—2 of FIG. 1.
Figure 11:
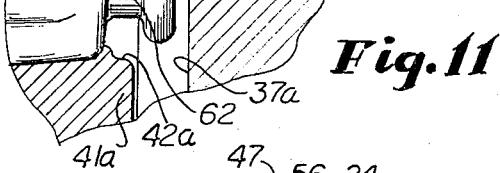

FIG. 11 is a fragmentary view similar to a portion of FIG. 2 of the modification of FIG. 10.

Tooth 11, shown in the accompanying drawings, is merely illustrative of one type of tooth which may be used in accordance with the present invention. It will be understood that the construction of such tooth is subject to wide variation. Similarly, the holder 12 is likewise subject to wide variation. The function of combination of tooth and holder is that the holder is permanently, or semi-permanently, attached to part of a piece of heavy excavating equipment (e.g., the edge of a dipper bucket), whereas the tooth 11 is subject to wear and is removed from time to time as required for replacement or sharpening.

Details of construction of the distal portion of tooth 11 are shown and described in detail in U.S. Pat. No. 4,050,172. Essentially, the tooth 11 has a distal portion 16 which performs the digging action. Distal portion 16, at its rearward end, has a shoulder 17 which bears against front edge 44 of holder 12. Forwardly of the shoulder 17 is a rib 18 which contributes to the digging action and adds strength to the tooth.

The proximal end of the tooth 11 comprises a shank 19 which again may be modified in shape. Reduced width portion 21 at the rear of shank 19 is formed for a purpose which is hereinafter described in detail. At the extreme proximal end of the shank 19 is an enlargement or button 22 having a shoulder 23 on its forward facing surface, again for a purpose hereinafter described. The reduced width portion 21 has a top surface 24 and may be formed with a step 26 to facilitate withdrawal of the retainer as hereinafter explained.

Holder 12 is formed with a recess 31 complementary to shank 19. The rearward end of holder 12 is shaped for permanent or semi-permanent attachment to the earth digging equipment. Recess 31 extends longitudinally. Transverse to recess 31 is an opening 32, here shown extending from top to bottom of the holder 12. It will be understood that the opening 32 might be horizontal or at some other angle. Opening 32 has a narrow width portion 33 at its forward end. Immediately outside portion 33 and extending somewhat rearwardly thereof is a broader width portion 34. Shoulder 36 separates the portions 33 and 34. Rearward of portions 33 and 34 is a smaller sized recess 37 which is shaped to receive button 22. Preferably to the rear of recess 37 is a ramp 38 sliding upwardly-rearwardly to the top surface of holder 12 to facilitate withdrawal of the retainers hereinafter described. The upper part or broader width portion 39 of portion 34 flairs outwardly and then upwardly for a purpose hereinafter described.

A lock receiving portion 41 of holder 12 extends into the opening 32 below the location of the reduced width portion 33. Preferably, the top 42 and the bottom 43 of portion 41 are horizontally truncated.

It will be observed that the structure heretofore described permits insertion of the shank 19 in the recess 31. The force imposed upon the distal end 16 of the tooth 11 during normal digging action is imparted to the holder 12 by the shoulder 17 bearing against the front edge 44. The retaining means hereinafter described do not function to absorb any of the force imposed in the digging action. The retaining means functions to prevent unintentional withdrawal of tooth 11 from holder 12. Such unintentional withdrawal might occur, for example, if the tooth were to stick in clay or perhaps even under gravitational forces.

The retaining means consists of a lock 46 and a key 56. Lock 46 is preferably fabricated of stainless steel and is of a spring construction. A preferred material is AISI 302 stainless steel and preferred dimensioned 3×8 mm. In the preferred shape shown in FIG. 8, lock 46 has a top 47 having at either end bowed portions 48 from which depend legs 49 having outwardly and then inwardly curved arcuate portions 51, at the lower extremeties. In the unstressed position of lock 46, legs 49 diverge at an angle of about 7½°.

Key 56 is likewise made of a spring steel construction. A preferred material is AISI 302 stainless steel having a cross-section of 4×10 mm. In the preferred form shown in FIG. 8, key 56 has a horizontal top portion 57 merging at either end in bowed portions 58 and having depending therefrom legs 59 which likewise diverge at an angle of about 7½°.

Figure 4:
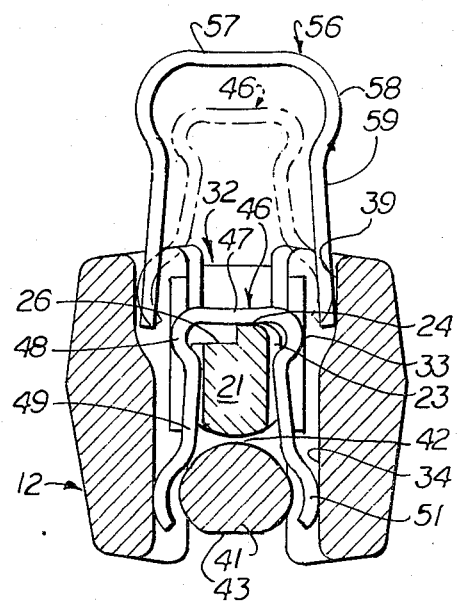
FIG. 4 is a sectional view taken substantially along the line 4—4 of FIG. 1 showing the key removed and showing the lock in solid line operative position when it is depressed in the cavity in the holder and in dotted line retracted position when it is elevated.

Directing attention now to FIG. 4 and specifically to the dot and dash position of lock 46 shown therein, the arcuate portions 51 are inserted in the wider part 39 of portion 34. The lock 46 is then depressed, either manually or with a hammer, causing the legs 49 to be forced slightly inward to the solid line position of FIG. 4 with the top 47 resting on top surface 24. It will be noted that in this position the arcuate portion 51 does not engage the lock receiving portion 41. However, the legs 49 are sufficiently close together as to interfere with the button 22 being drawn forwardly if it were desired to withdraw the tooth 11. In the position shown in FIG. 4, the key 56 has not been inserted into the holder 12, but is shown in solid line position withdrawn.

Directing attention now to FIG. 4A, when the key 56 is depressed, either manually or by a hammer, the legs 59 are compressed inwardly and intersect the arcuate portion 51 forcing the arcuate portion 51 inward around the lock-receiving portion 41 as shown in FIG. 4A. The bows 58 fit against the wider part 39, thus limiting downward movement of the key 56. Because the legs 49 and 59 have been compressed or stressed inward from their unstressed outward-diverging positions shown in FIGS. 8 and 9, Any tendency of the lock 46 or key 56 to rise out of position is overcome despite vibration, inversion or other factor.

When it is desired to remove the tooth 11, a screwdriver or other means is slid forwardly and downwardly relative to the ramp 38 until the blade fits under top 57 of key 56. By a leverage action, the key 56 is raised from the solid line position of FIG. 4A to the solid line position of FIG. 4. Thereupon the blade is used to pry the top 47 of lock 46 upward from the solid line to the dotted line position of FIG. 4. The step 26 facilitates insertion of the blade of the screwdriver under top 47. It is unnecessary to fully remove lock 46, it is only necessary that the leg 49 be removed sufficiently to provide clearance for button 22 as the tooth moves forwardly.

In the modification shown in FIG. 10, the proximal end of tooth 11a is substantially the same as in U.S. Pat. No. 4,050,172. The reduced portion denominated in said Patent as "21a" is replaced by spindle 62 of round cross-section. Stop 61 protrudes into opening 32a and restrains downward movement of top 47a. The advantage of this construction is that by certain changes in the core of the casting of holder 12a, retainers 46a and 56a may be inserted from either side, top, bottom or other angle relative to holder 12a. Other elements of the construction of FIG. 10 resemble those of the preceding modification and the same reference numerals followed by subscript a indicate similar parts.

What is claimed is:

1. In combination, an excavating tooth having a distal portion having a cutting edge at one end and a first shoulder at its opposite end and a proximal portion having a reduced width portion and a second shoulder rearward of said reduced width portion; a holder having a distal end shaped to receive the thrust of said first shoulder as said tooth digs, said holder being formed with a recess extending inward from said distal end to receive said proximal portion of said tooth and an opening spaced rearward from said distal end and extending generally transverse to said recess and intersecting said recess, said opening having opposed side walls, a first retainer formed of resilient material and having a first connecting portion and a pair of initially outward diverging first legs, said first legs being slidable into said opening between outer and inner positions and when in the inner position being opposite said reduced width portion and forward of said second shoulder and a second retainer formed of resilient material and having a second connecting portion and a pair of initially outward diverging second legs, said second legs being wider apart than said first legs, said second retainer being slidable into said opening between outer and inner positions and when in the inner position being located between said first legs and said side walls and compressing said first legs into inward position, said first legs when in inward position restraining withdrawal of said tooth from said holder by interfering with outward movement of said second shoulder.

2. The combination of claim 1 which further comprises a lock receiving portion formed on said holder and extending into said opening, said first legs being formed with lock engaging portions which engage with said lock receiving portion when said first legs are in inward position.

3. The combination of claim 1 in which said side walls are formed with first and second grooves to receive said first and second legs, respectively.

4. The combination of claim 3 in which said second legs are wider than said first legs and said second grooves correspondingly wider than said first grooves.

5. The combination of claim 4 in which said side walls are formed with third shoulders defining separations between said grooves.

6. The combination of claim 1 which further comprises stop means to restrain the extent of movement of said first retainer into said opening.

7. The combination of claim 6 in which said stop means comprises the upper surface of said reduced width portion of said tooth.

8. The combination of claim 7 in which said upper surface is formed with a step and said side opening is formed with a ramp slanting upwardly-rearwardly so that the blade of a prying tool placed on said ramp fits between said steps and said first connecting portion to pry said first retainer from inner to outer positions.

9. The combination of claim 6 in which said stop means comprises an extension of said holder into said opening to intersect said first connecting portion.

* * * * *